(12) United States Patent
Giordano et al.

(10) Patent No.: US 12,467,028 B2
(45) Date of Patent: Nov. 11, 2025

(54) MILLIFLUIDIC DEVICE FOR ADVANCED CULTURES OF BIOLOGICAL AGENTS

(71) Applicant: POLITECNICO DI MILANO, Milan (IT)

(72) Inventors: Carmen Giordano, Milan (IT); Manuela Teresa Raimondi, Milan (IT); Luca Izzo, Roe' Volciano (IT); Matteo Lagana, Longone al Segrino (IT); Diego Albani, Limbiate (IT); Paola Petrini, Milan (IT)

(73) Assignee: POLITECNICO DI MILANO, Milan (IT)

( * ) Notice: Subject to any disclaimer, the term of this patent is extended or adjusted under 35 U.S.C. 154(b) by 785 days.

(21) Appl. No.: 17/760,811

(22) PCT Filed: Sep. 8, 2020

(86) PCT No.: PCT/IB2020/058339
§ 371 (c)(1),
(2) Date: Mar. 16, 2022

(87) PCT Pub. No.: WO2021/053458
PCT Pub. Date: Mar. 25, 2021

(65) Prior Publication Data
US 2022/0340854 A1    Oct. 27, 2022

(30) Foreign Application Priority Data
Sep. 16, 2019   (IT) .................. 102019000016376

(51) Int. Cl.
*C12M 1/00*    (2006.01)
*C12M 1/34*    (2006.01)
(Continued)

(52) U.S. Cl.
CPC ............ *C12M 29/10* (2013.01); *C12M 23/16* (2013.01); *C12M 23/58* (2013.01); *C12M 29/04* (2013.01); *C12M 35/02* (2013.01); *C12M 41/46* (2013.01)

(58) Field of Classification Search
None
See application file for complete search history.

(56) References Cited

U.S. PATENT DOCUMENTS

2016/0220994 A1* 8/2016 Wright .............. B01L 3/502738
2016/0346778 A1* 12/2016 Wright .................... B01L 3/502
2017/0299578 A1* 10/2017 Nath ....................... C12M 25/02

FOREIGN PATENT DOCUMENTS

| EP | 2913389 A1 | 9/2015 |
|---|---|---|
| WO | 2017091718 A1 | 6/2017 |
| WO | 2017199121 A1 | 11/2017 |

OTHER PUBLICATIONS

Ostrovidov, et al.; "Membrance-based PDMS microbioreactor for perfused 3D primary rat hepatocyte cultures"; Biomedical Microdevices; Netherlands; Dec. 1, 2004.

* cited by examiner

*Primary Examiner* — Michael A Marcheschi
*Assistant Examiner* — Ashley Lopezlira
(74) *Attorney, Agent, or Firm* — Dickinson Wright PLLC; Andrew D. Dorisio (57) ABSTRACT

A millifluidic device for cultures of biological agents includes a main body having a first hole closed at the bottom, a separator a membrane fixed to the separator, and a plug closing the first hole. The separator is designed to be placed in the first hole and is extractable from the first hole. The membrane divides the first hole into an upper half-chamber and a lower half-chamber. A pair of tubes perfuse the lower half-chamber and another pair of tubes perfuse the upper (Continued)

half-chamber. A first slide is placed centrally on the plug and a second slide is placed centrally on the first hole. A cylindrical body rises from the first hole and the second slide is placed on the top of the cylindrical body. The cylindrical body has a second hole, coaxial to the cylindrical body.

11 Claims, 7 Drawing Sheets

(51) Int. Cl.
*C12M 1/42* (2006.01)
*C12M 3/06* (2006.01)

MILLIFLUIDIC DEVICE FOR ADVANCED CULTURES OF BIOLOGICAL AGENTS

This application is a national stage application under 35 U.S.C. § 371 of PCT Application PCT/IB2020/058339, filed Sep. 8, 2020; which claims benefit to Italian Patent Application IT102019000016376, filed Sep. 16, 2019; said applications incorporated herein by reference.

TECHNICAL FIELD

The present invention refers to a millifluidic device for advanced cultures of biological agents.

BACKGROUND

Devices for cell cultures exist, such as modular bioreactors having separate perfusion chambers where each chamber is independent and isolated from the others like a perfusion circuit, but at the same time, can be connected by bypass. These chambers are optically accessible and allow inspection of the cell culture by both standard and confocal optical microscopy, both in white light, in phase-contrast and fluorescent light.

A device, mentioned above, is described in the patent application WO2017/199121 in the name of the same Applicant.

Another similar device is described in the document WO2017/091718.

SUMMARY

The aim of the present invention is that of providing a millifluidic device for advanced cultures of biological agents which has a greater modularity than those of the known art.

Another aim is that of providing a device which enables a greater ease of use.

A further aim is that of providing a device that is simple to manufacture.

According to the present invention, these aims and others still are achieved by a millifluidic device for cultures of biological agents Further characteristics of the invention are described.

The advantages of this solution compared to the solutions of the known art are numerous.

The invention consists of a sealing device for the perfused culture of cells or bacteria both in suspension and adhesion, in 2D or 3D, for producing perfused solutions containing parts derived from cells (e.g. micro/nanovesicles), or biological molecules (e.g. protein or isolated DNA) or even bioactive chemical compounds (e.g. drugs).

The device consists of a host system formed of different culture/dilution chambers independent of one another, which are extractable and made with different diameters/measurements. The extractability enables an easy cell seeding on both sides of the membrane, and the possibility of reusing the body of the device by replacing the used culture chambers with new chambers and by sterilising the resulting device again.

The chambers host a membrane, which separates them into two half-chambers, of a permeable or, semi-permeable type with different porosity or non-permeable type, composed of different materials, such as polycarbonate, PET, PVC, polytetrafluoroethylene (TEFLON), PDMS, cellulose acetate, polyester, polystyrene, nylon and others.

The two half-chambers can be interconnected or independent of one another by appropriately choosing the material and the porosity of the membranes.

The cell cultures can be produced on one or both sides of the membrane, located in the culture chamber.

The device is optically accessible with standard optical microscopy and in phase-contrast, both straight and inverted, both in white light and fluorescent light, and with confocal microscopy. The device therefore allows inspection of the cell culture, in both chambers, by using the aforementioned microscopy techniques without interrupting the culture itself. The optical accessibility allows the device to be used with any type of optical sensor, for example a sensor for measuring pH, oxygen, carbon dioxide and allows measuring the concentration of solutes in a perfused solvent.

The device can be manufactured both in the absence and presence of electrodes, which are useful for measuring electrical parameters relevant to cellular and bacterial behaviour and for electrically stimulating cellular or bacterial cultures contained in each culture chamber, in a configuration that does not compromise the optical accessibility, thus guaranteeing a wide surface in contact with the content of the culture chamber. The electrodes can be conveniently and economically obtained by laser cutting from suitable metal sheets, for example, made of stainless steel or precious metals having a thickness from 0.05 to 0.2 mm.

The device is modular due to several aspects.

a) Geometry of the perfused culture chamber, which can also be manufactured in different sizes and can house both cells and bacteria in suspension, in a monolayer (2D), in gel (3D) or in three-dimensional mediums (3D), either alone or interfaced through the separation membrane positioned in the culture chamber itself.

b) Number of perfusion chambers, each one independent of the others like perfusion circuit but, at the same time, connectable to one another by bypass.

c) Opening/closing mechanism, since each perfusion chamber has its own cover which can be operated independently of the other chambers.

In particular, several devices can be connected to each other by creating a multi-device platform capable of simultaneously hosting and interfacing together different types of cell and bacterial cultures or types containing cell/bacteria derivatives, namely, chemically synthesised molecules, in the configurations described above, both for suspensions and with adhered cells grown in 2D or 3D.

The device and the resulting platform can be interfaced with liquid bacterial culture systems, either directly or through a dedicated system for producing bacterial cultures, in both standard liquid culture conditions, in suspension and in 2D, as well as cultivated in appropriate matrices in 3D, with a geometry similar to the culture chambers of the device.

d) Membrane support system, easily extractable from the device and manipulable. This characteristic makes it possible to carry out cell seeding operations and/or carry out assays and measurements outside the device, with established routine techniques. The extractable support system also makes it possible to quickly change the geometry of the perfusion chambers, by simply changing the type of membrane housing used, even by using commercially available inserts that are sterile and suitable for cell cultures. The advantage of this highly modular system is that it is possible to set different experimental conditions in each chamber, even by using the same base body of the device and/or without having to completely reassemble the entire experimental set-up.

e) System characterised by a double level of seals designed to isolate the two fluidic paths on both sides of the membrane and to prevent leakage of liquid outside of the chamber.

f) Anti-lifting safety system for the plugs, consisting of screws, or other fixing means, which make the system operable even at high pressure/high capacities. This system makes it safe to use the device even for long periods of time, and for frequent handling for carrying out microscopic inspections, namely, when stably mounted inside a microscope provided with a cell incubator.

The device can be used for research and analysis of bioactive molecules within the biological, medical, biochemical and chemical, pharmacological and toxicological fields. In general, the device can be applied to all those situations, known or still unknown, characterised by the need to optically inspect and/or electrically stimulate and/or electrically measure biological parameters after interactions between two liquids (equal or different) that perfuse two sides of a membrane (or the surfaces of a non-porous septum), and that contain viable biological material, derived from vital systems or those of a chemical nature, on which membrane or septum, a third element (adhered or laid) may or may not be placed.

The characteristics and advantages of the present invention will become evident from the following detailed description of a practical embodiment thereof, illustrated by way of non-limiting example in the attached drawings, wherein:

DETAILED DESCRIPTION

With reference to the attached figures, a device 10 for cell culture, according to the present invention, comprises a main rectangular-shaped body 11, with plan overall dimensions so that it can be housed in a slide holder for standard and confocal microscopy (for example: length from 60 mm to 80 mm, width from 20 to 30 mm, preferably length 68 mm width 25 mm).

The main body 11, as shown, comprises three chambers 12, 13 and 14, with an independent hydraulic circuit.

The number of chambers can be varied from one to multiple according to the needs.

Figure 1:
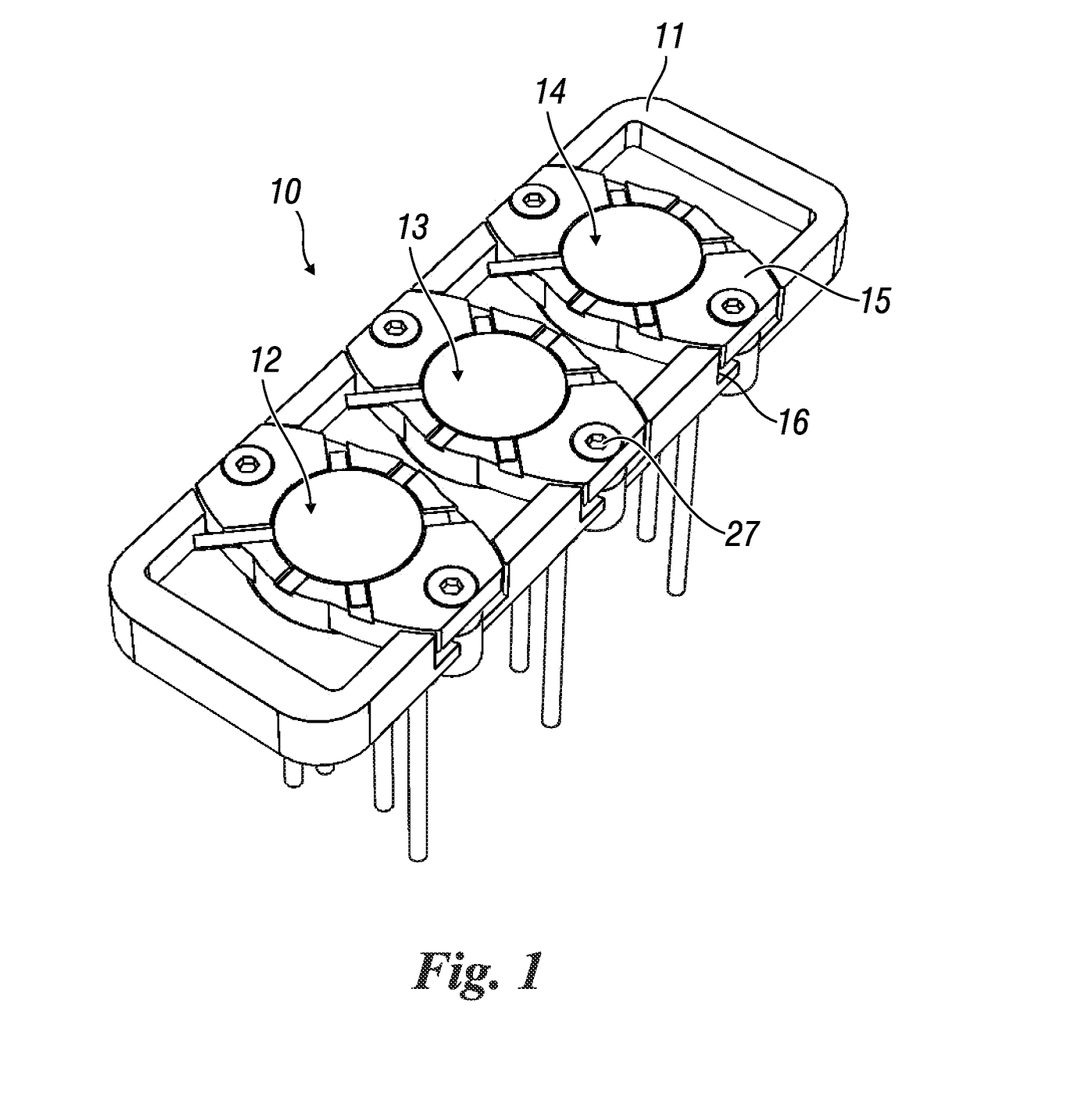
FIG. 1 shows a millifluidic device for advanced cultures of biological agents, in a top perspective view, according to the present invention.

The three chambers 12, 13 and 14 are each provided with an oval-shaped and elongated plug 15 that reaches the edges of the body 11. Recesses 16 are arranged on the edge of body 11 in which the ends of plug 15 are positioned in order to have a guide for the correct positioning of the plugs 15 themselves.

The plugs 15 preferably comprise two through-holes 17, placed at the ends, in order to fix them firmly on the body 11 by means of screws. Alternatively, other means for fixing the plugs 15 to the body 11 can be used, such as, for example, hooks or pressure systems.

Figure 7:
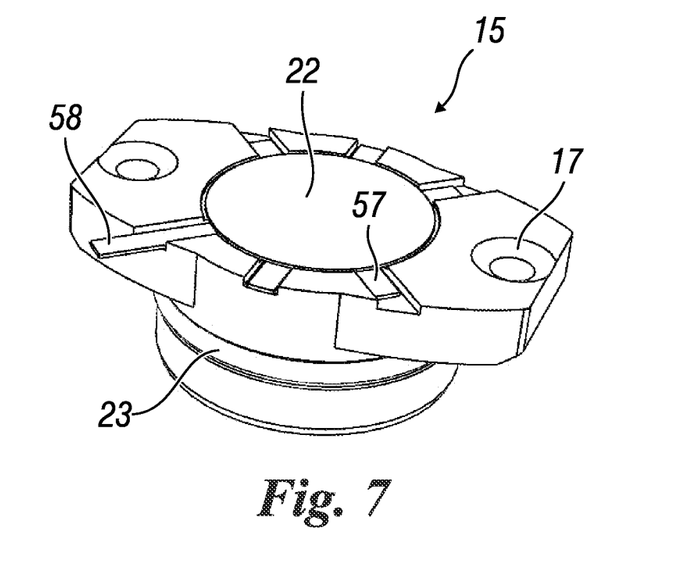
FIG. 7 shows a plug of a millifluidic device for advanced cultures of biological agents, in a top perspective view, according to the present invention.
Figure 8:
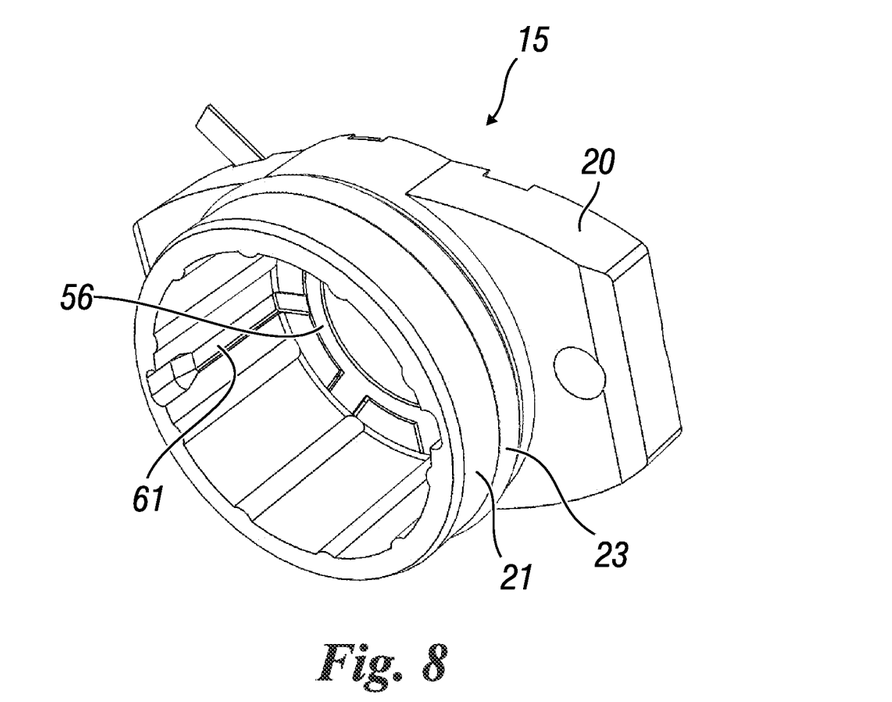
FIG. 8 shows a plug of a millifluidic device for advanced cultures of biological agents, in a perspective view from below, according to the present invention.

The plugs 15 have a substantially flat upper component 20 and a cylindrical-shaped lower component 21.

A preferably circular-shaped slide 22 is fixed on the upper and central component to the plug 15 which allows a complete view of the inside of the chamber, for use with microscopes.

An O-ring seal 23 is arranged externally to the lower component 21.

Figure 2:
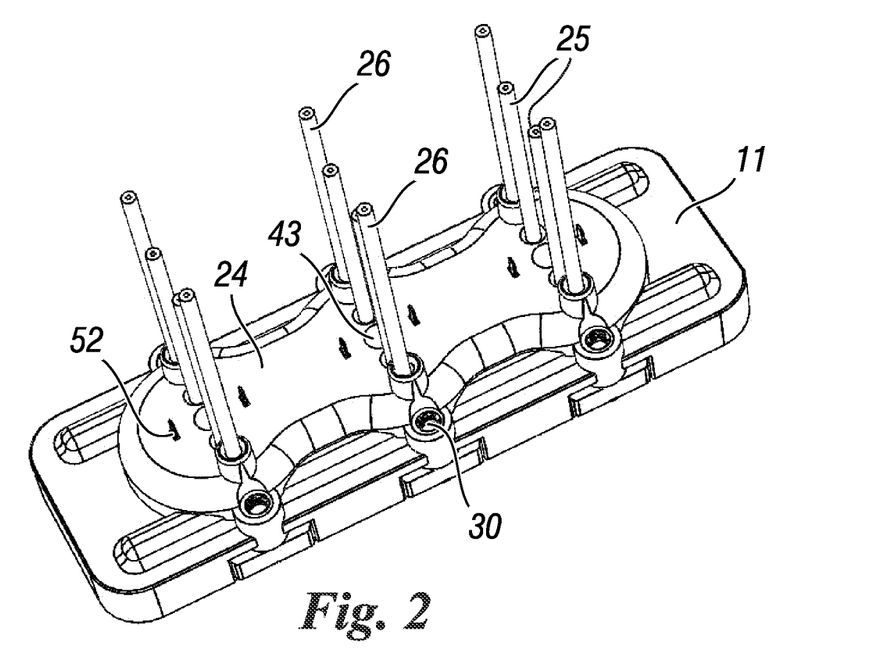
FIG. 2 shows a millifluidic device for advanced cultures of biological agents, in a perspective view from below, according to the present invention.

Below the body 11, two pairs of tubes can be seen for each chamber, which protrude perpendicular to the body 11, and more specifically, exit from a lower enlarging 24 of the body 11 which provides space for the chambers 12-14.

A pair of internal tubes 25, with an inlet tube and an outlet tube, for a first half-chamber (which we will define in the following) and a pair of external tubes 26, with an inlet tube and an outlet tube, for a second half-chamber.

Figure 3:
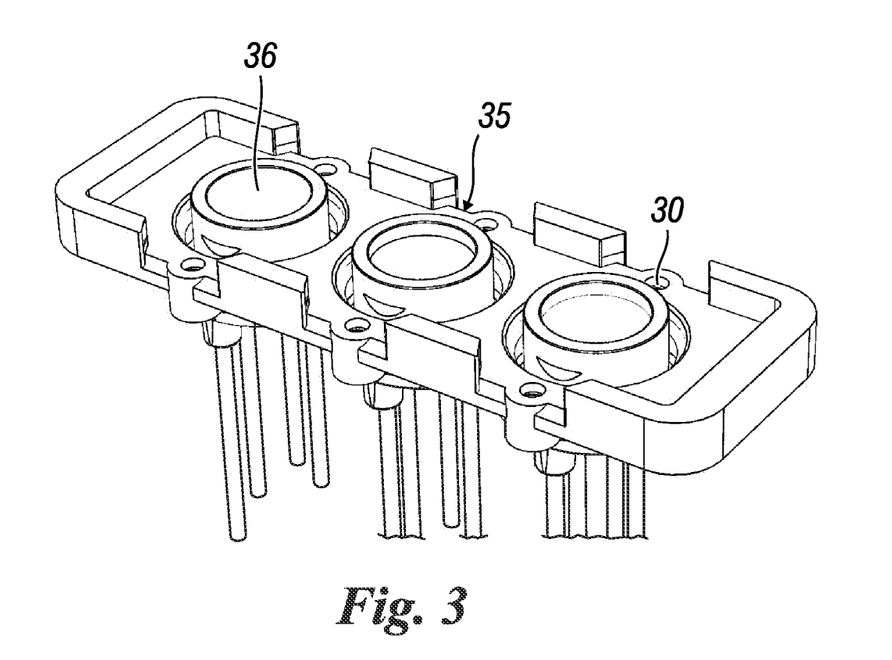
FIG. 3 shows a millifluidic device for advanced cultures of biological agents, without plugs, in a top perspective view, according to the present invention.

The threaded holes 30 can be seen on the body 11, which correspond to the holes 17 for fixing the plugs 15 onto the body 11 by means of screws 27.

Once the plugs 15 are removed the separators 35 can be seen which allow each of the chambers 12-14 to be divided into two half-chambers.

Figure 9:
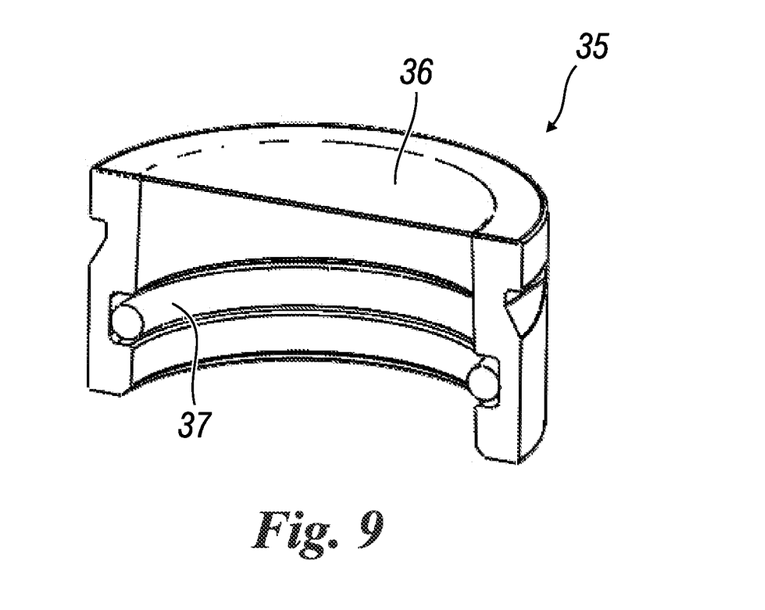
FIG. 9 shows a separator of a millifluidic device for advanced cultures of biological agents, in a perspective and sectional view, according to the present invention.

The separators 35 have a hollow cylindrical-shape open at the bottom and closed at the top by a membrane 36, to form an overturned glass-shape, closed at the top by the membrane 36.

The membrane 36 divides the upper half-chamber from the lower half-chamber.

Figure 5:
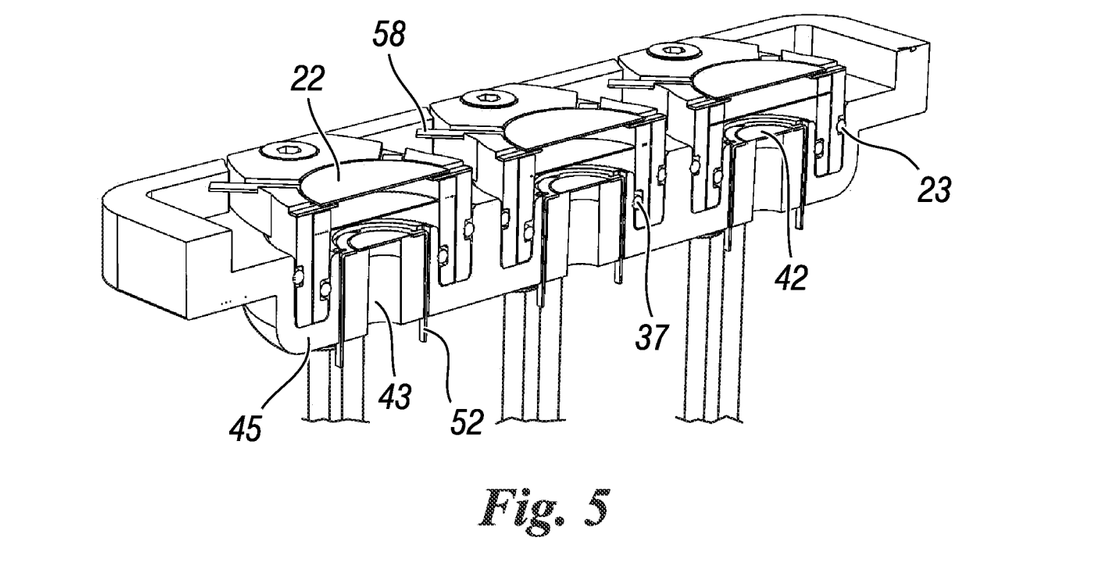
FIG. 5 shows a millifluidic device for advanced cultures of biological agents, in a perspective and sectional view, according to the present invention.
Figure 6:
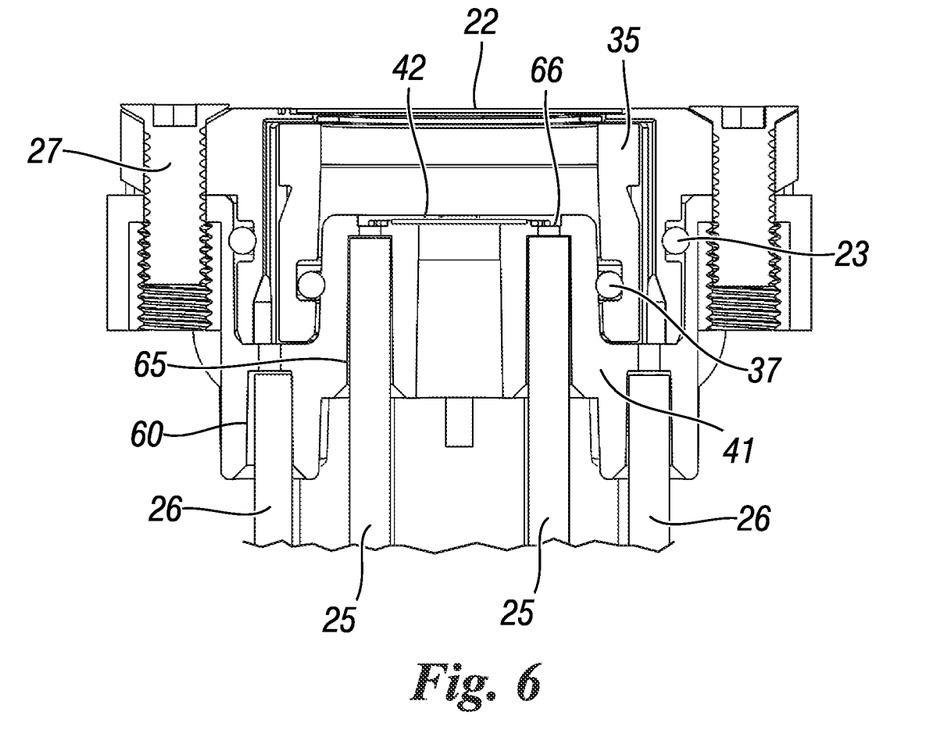
FIG. 6 shows, in a sectional view, a chamber of a millifluidic device for advanced cultures of biological agents, according to the present invention.

The membrane 36 can be placed (glued) at the top of the separators 35 as shown in FIGS. 3 and 9, but can be placed in positions inside the separator 35 as shown in FIGS. 5 and 6, particularly at a predefined distance from the top of the separator 35.

In particular, if the membrane 36 is placed at the top of the separators 35, the upper half-chamber is 0.3 mm high. In the case of other positioning of the membrane 36, a separator 35 is made formed by two parts having pre-set heights. The membrane 36 is glued onto the lower part of the separator and then the upper part of the separator is glued, thus positioning the membrane at the desired height and obtaining the two half-chambers having predefined heights.

The positioning of the membrane 36 allows to increase or decrease the volume of the upper half-chamber and consequently decrease or increase the volume of the lower half-chamber.

An O-ring seal 37 is placed inside the separators 35, preferably in a position spaced from the membrane 36.

Figure 4:
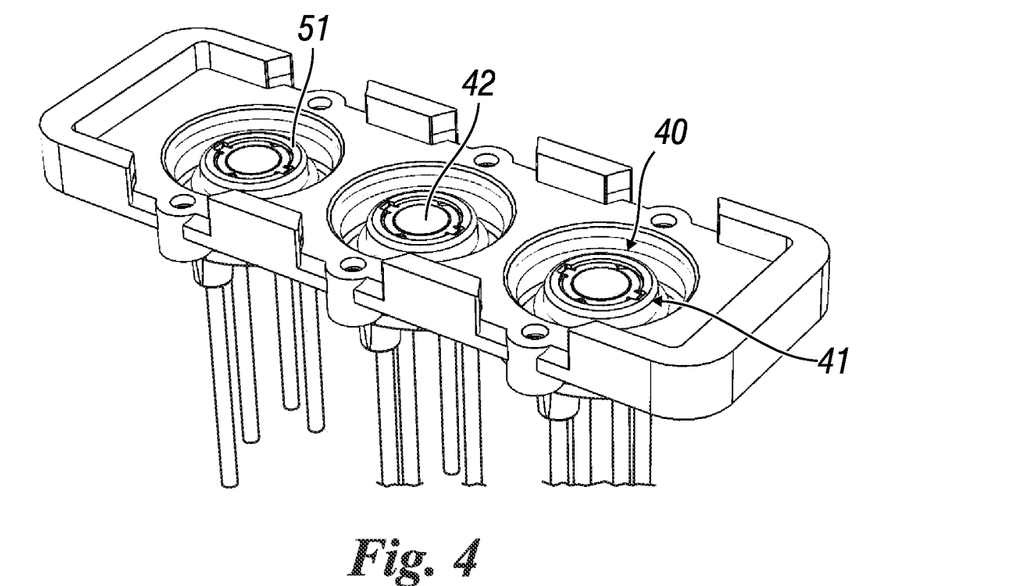
FIG. 4 shows a millifluidic device for advanced cultures of biological agents, without plugs and without separators, in a top perspective view, according to the present invention.

When the separators 35 are removed, the prearranged areas for the chambers can be seen in body 11.

For each chamber 12-14 there is a hole 40 in the body 11 closed at the bottom. At the centre of the hole 40, and coaxially thereto, a cylindrical body 41 protrudes. A preferably circular-shaped slide 42 is placed at the top of the cylindrical body 41, which allows a complete view of the inside of the chamber, for use with microscopes.

The slide 42 can be omitted if the materials used to make the device are transparent.

The inside of the cylindrical body 41 is hollow and forms a hole 43, coaxial to the cylindrical body 41, which is open at the bottom and closed at the top by the slide 42.

The hole 43 allows there to be less material in the optical path of the microscopes, thus allowing a better view of the inside of the half-chambers.

The separator 35, including the membrane 36, is set in its place above the cylindrical body 41.

The separator 35 can only be extracted from its place by opening the plug 15 and pulling it out, and it can be set again in its place by inserting it on top of the cylindrical body 41.

The pairs of tubes 25 and 26 are laterally aligned with the hole 43 and transversely to the body 11.

Figure 10:
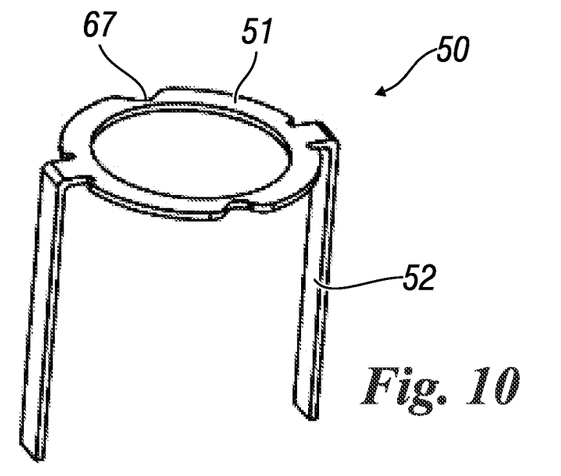
FIG. 10 shows a first electrode of a millifluidic device for advanced cultures of biological agents according to the present invention.
Figure 11:
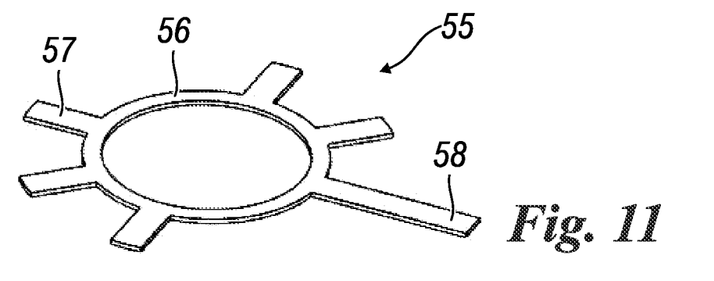
FIG. 11 shows a second electrode of a millifluidic device for advanced cultures of biological agents, according to the present invention.

The device preferably comprises two electrically conductive electrodes, one for each half-chamber.

The electrodes can be used both for measuring electrical parameters and for electrically stimulating the cultures contained in each culture chamber, such as, for example, for measuring the transepithelial/transendothelial resistance, for determining the onset of ionic currents passing through cell membranes, useful for physiological and neurobiological studies or for inducing tissue contraction, useful for simulating muscle contractions such as peristalsis.

An electrode 50 for the lower half-chamber has a main circular crown-shaped body 51 with two bars 52 which extend from the circular body 51 and are facing downwards, for electrical connection.

The electrode 50 is placed above the cylindrical body 41 and the circular body 51 is external to the slide 42 and in the area of the lower half-chamber. The two bars 52 protrude at the bottom from the body 11 (enlargement 24).

An electrode 55 for the upper half-chamber has a main circular crown-shaped body 56, and has some bars 57, to facilitate the positioning, and a bar 58, longer than the previous ones for electrical connection, which extend from the circular body.

The electrode 55 is placed in a housing on the plug 15, and the circular body 56 is external to and below the slide 22, so that it is positioned in the area of the upper half-chamber.

The electrodes 50 and 55 have a main circular crown-shaped body, therefore with a central hole, which does not compromise the optical accessibility.

Each half-chamber is sealed and isolated and communicates with the outside only with the pairs of tubes 25 and 26. Only the type of membrane 36 determines the permeability between the two half-chambers. For example, it is possible to insert membranes made of polycarbonate, PET, PVC, polytetrafluoroethylene (TEFLON), PDMS, cellulose acetate, polyester, polystyrene, nylon, with a pre-defined porosity.

The internal seal 37 of the separators 35 interferes with the external lateral surface of the cylindrical body 41, and closes the lower half-chamber, delimited at the top by the membrane 36, at the bottom by the slide 42 and at the sides by the separator 35.

The external seal 23 of the plug 15 interferes with the internal lateral surface of the hole 40, and closes the upper half-chamber, delimited at the top by the slide 22, at the bottom by the membrane 36 and at the sides by the lower component 21 of the plug 15 or by the separator 35.

The cylindrical body 41, which emerges from the hole 40, forms a base 45, around the cylindrical body 41, with a circular crown-shape that acts as the lower reference abutment for both the plug 15 (lower component 21) and the base of the separator 35.

Therefore, after the opening of the plug 15 and the extraction of the separator 35, when they have to be inserted again, both are positioned correctly as in the original position.

The perfusion of the chambers takes place via the pairs of tubes 25 and 26.

The upper half-chamber uses the outermost pair of tubes 26. They are fixed in a hole 60 of the body 11 and reach the base 45 and are aligned with the line where the separator 35 and the plug 15 are arranged side-by-side.

Between the separator 35 and the plug 15 a passage is prearranged that reaches the upper half-chamber. This passage is a pair of grooves 61 prearranged on the internal lateral wall of the plug 15 and, to facilitate the inflow inside the half-chamber, the groove also partially continues on the upper internal wall of the plug 15 until it reaches the slide 22 and/or the electrode 55.

This fluid path can also be conveniently made by means of metal tubes connected to the plug and integral thereto and which are close to or, better still, engage directly in the internal lumen of the tubes 26 once the device has been assembled.

The lower half-chamber uses the innermost pair of tubes 25. They are fixed in a hole 65, side-by-side to the internal wall of the separator 35 and reaches a through-hole 66, between the external edge of the separator 35 and the slide 42.

If the electrode 50 is present, it has a bevelling 67 at the hole 66 to allow the perfusion flow.

The electrodes 50 and 55, made of an electrically conductive material, may be present or absent in the device according to the needs.

In one embodiment of the device, the body 11 has a size of 25×68 mm, the half-chambers (upper and lower) have an average diameter comprised between 5 and 12 mm (preferably 10 mm) and a depth comprised between 0.3 mm and 1.8 mm (preferably 0.3 mm for the upper half-chamber and 1.8 mm for the lower half-chamber). In this case the membrane 36 has been placed above the separator 35. The device 10 can be used for the culture of cells derived from living organisms both of the immortalised type (i.e. able to replicate indefinitely in culture) and of the primary type (i.e. with a limited or no capacity to replicate in culture), both in suspension and adhesion, in 2D and hosted in 3D in appropriate polymeric mediums and matrices. It may also be adapted for incubating parts derived from cells (e.g. microvesicles or particular cellular organelles), as well as for bacteria or solutions containing chemical molecules, including drugs.

It can also be used to combine a culture, for example neurons or endothelial cells or specific bacteria, grown individually or in co-culture such as in the intestinal microbiota, in one half-chamber, and a culture in the other half-chamber, such as, for example, astrocytes or blood cells or endothelial cells of the intestine to analyse how their interaction is of physiological or pathological relevance.

Figure 12:
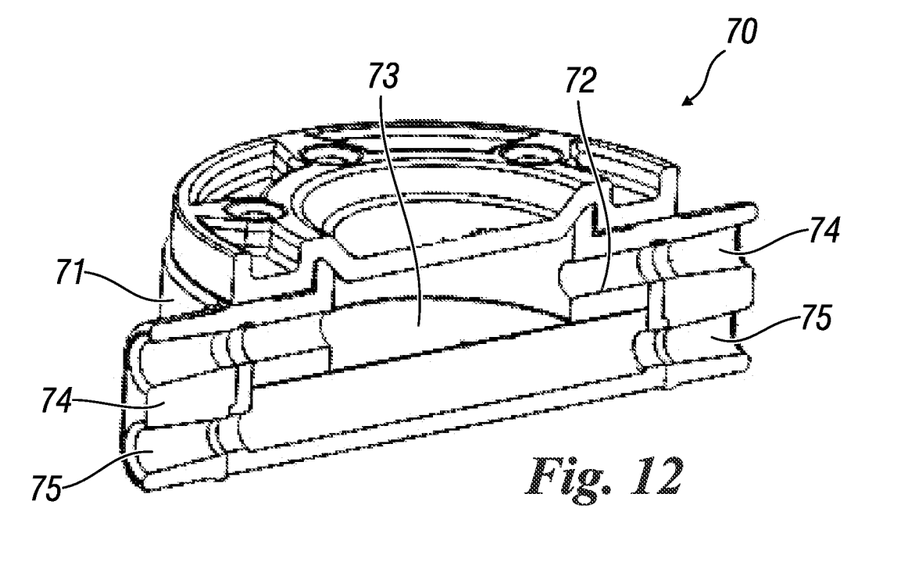
FIG. 12 shows a millifluidic device for advanced cultures of biological agents, in a perspective and sectional view, according to a first variant of the present invention.

According to a first variant of the present invention, the device is now shown as a single device but could be structured, as in the previous case, with two or more devices placed in a single body.

In this case the single device 70 has a substantially circular body 71, and comprises an extractable separator 72, formed by a circular disc to the bottom of which a membrane 73 is fixed, which divides the body 71 into two half-chambers, one upper and one lower. The separator 72, when inserted in the body 71, rests on an edge arranged in body 71 itself.

The perfusion channels 74 and 75, created inside body 71, access the two half-chambers at the sides and are parallel to the membrane. The connection tubes (not shown) can possibly be applied to the channels 74 and 75.

The device 70 can be used on its own or can be used in combination with the device 10.

In particular it is possible to cultivate, in the device 70, a bacterial culture placed in a half-chamber, fed by a fermenter or a bacterial culture in a suitable container, potentially also connected to a device that allows the mixing of bacteria in a polymeric matrix that simulates, for example, the intestinal mucus in the case of bacterial culture in 3D; the resulting secretome, namely, the set of molecules produced by the resulting culture, is transferred through the membrane into the other half-chamber and is sent to one or more chambers of the device 10 to verify the impact of the molecules produced on particular organs and biological systems, under physiological or pathological conditions including, by way of example but not limited to: intestinal endothelium: liver; immune system; blood-brain barrier; brain. In this case a porous membrane is used with a molecular cleaving that allows the passage of substances but not of cells (typically 0.1 micrometers between bacteria and secretome and 0.4 for the other half-chambers hosting cell cultures).

Figure 13:
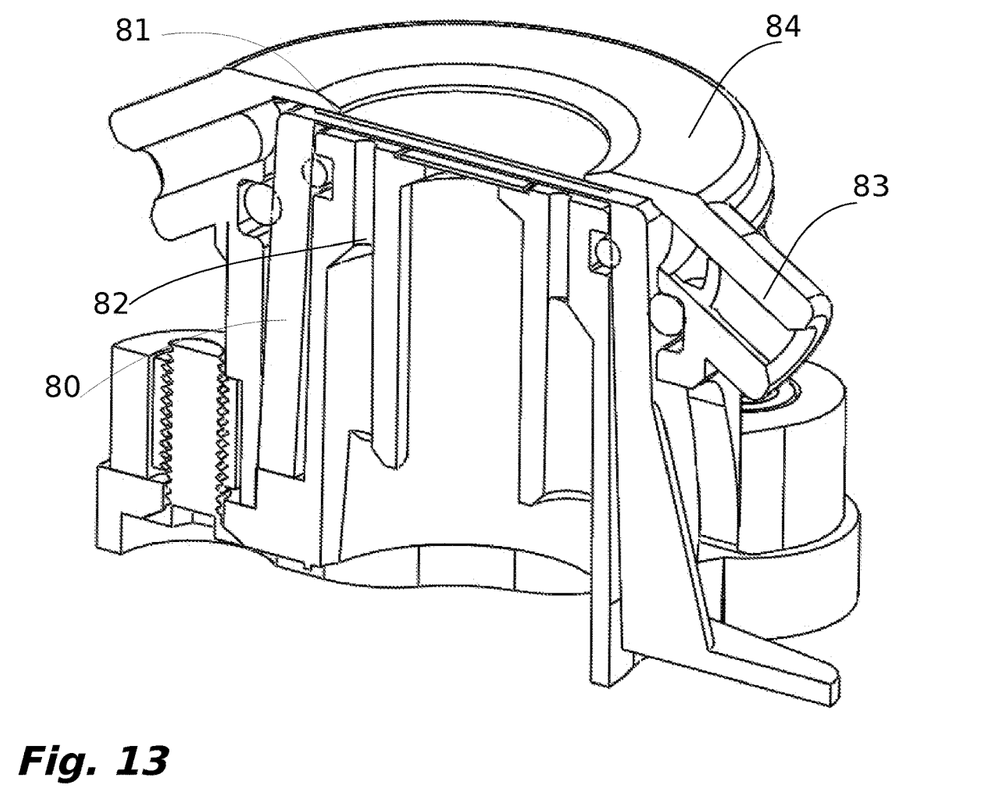
FIG. 13 shows a millifluidic device for advanced cultures of biological agents, in a perspective and sectional view, according to a second variant of the present invention.

According to a second variant of the present invention, the perfusion of the lower half-chamber takes place as previously described from the tubes 82 coming from below and placed inside the device, while the perfusion of the upper half-chamber takes place through tubes 83 placed in the plug 84. The half-chambers are separated by the membrane 81 supported by a small cylindrical element 80, which may also be of the already commercially available type. For example, it is possible to use chambers compatible with Transwell type cell culture inserts produced by Greiner Bio-One International GmbH, both with translucent and transparent membranes.

Figure 14:
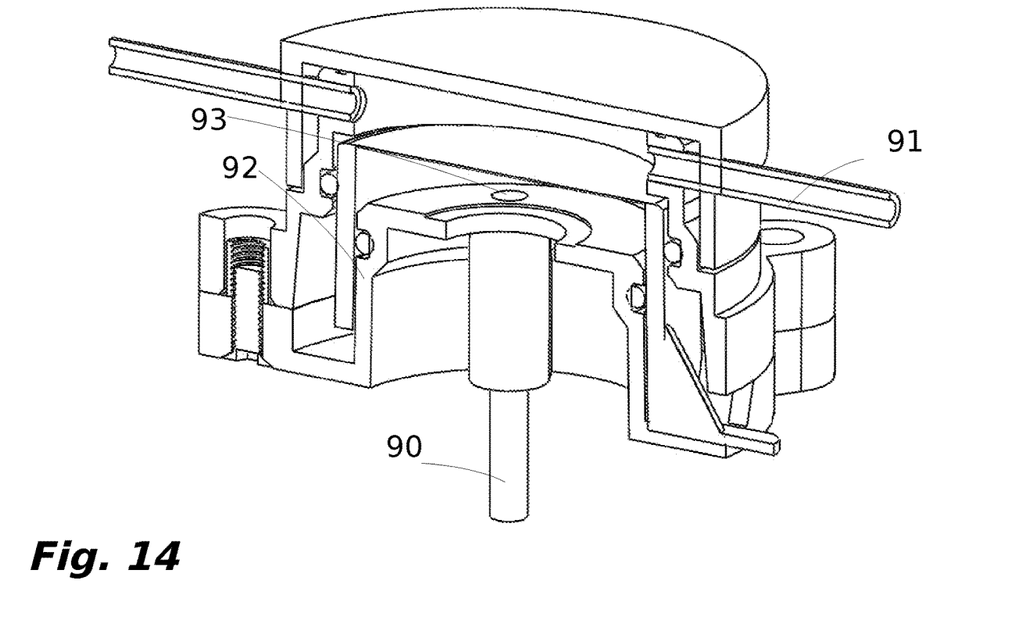
FIG. 14 shows a millifluidic device for advanced cultures of biological agents, in a perspective and sectional view, according to a third variant of the present invention.

According to a third variant of the present invention, perfusion of the lower half-chamber takes place by means of tubes 90 placed below the device, the perfusion of the upper half-chamber takes place by means of tubes 91 placed in the plug, and the two half-chambers are separated by a separator 92 supporting a membrane 93.

All the components are made of plastic and elastomeric materials and are designed to be manufactured by injection moulding of plastic materials or other manufacturing method that can be applied on an industrial scale.

The materials as well as the dimensions and shapes used can be of any type according to the needs and the state of the art. For example, the chambers and all the connected elements have been made in a circular shape but nothing prevents them from being made in other shapes such as square or oval.

In another possible embodiment, the device is made with individual chambers, which can be divided to host inserts and membranes that are commercially available and already used in the biological field for cell cultures. Both the lower and upper parts of these chambers contain a suitable gasket (e.g. OR) such as to interact with the commercial insert and guarantee sufficient hydraulic sealing to be able to perfuse the two sides of the membrane, according to the configuration of the channels described above and the possible combinations of devices. These individual chambers are also provided with the connection via screws or other mechanical means, suitable to avoid the division of the chamber under the pressure exerted by the perfusion fluid. These individual chambers are optically accessible as previously described for other configurations of the device. These individual chambers can be inserted in a suitable housing that can contain several chambers and can be housed in a microscope suitable to inspect the perfused culture through the optical accesses obtained in each chamber. These individual chambers can house electrodes as previously described for the other configurations and can also be easily connected to one another or to other millifluidic or microfluidic devices, in both series and parallel configuration.

The device thus conceived is susceptible to numerous modifications and variations, all falling within the scope of the inventive concept; moreover, all the details can be replaced by technically equivalent elements.

The invention claimed is:

1. A millifluidic device for cultures of biological agents comprising:
    a main body (11) comprising at least one chamber with an independent hydraulic circuit, the at least one chamber including a first hole (40) closed at a bottom;
    a separator (35);
    a membrane (36) fixed to said separator (35);
    a plug (15) closing said first hole (40);
    said separator (35) designed to be placed in said first hole (40);
    said separator (35) being extractable from said first hole (40) once the plug (15) is removed;
    said membrane (36) divides said first hole (40) into an upper half-chamber and a lower half-chamber;
    a pair of tubes (25) to perfuse said lower half-chamber;
    a pair of tubes (26) to perfuse said upper half-chamber;
    a first slide (22) placed centrally on said plug (15) and adapted to allow a complete view of an inside of the at least one chamber;
    a second slide (42) placed centrally on said first hole (40) and adapted to allow a complete view of the inside of the at least one chamber;
    said first hole (40) is closed at the bottom by said second slide (42);
    a cylindrical body (41) rises from said first hole (40) and said second slide (42) is placed on the top of said cylindrical body (41);
    said cylindrical body (41) has a second hole (43) coaxial to said cylindrical body (41), and said second hole (43) is open at the bottom and closed at the top by the second slide (42), wherein:

said pairs of tubes (25) and (26) are laterally aligned with said second hole (43) and transversely to said main body (11);

the lower half-chamber is delimited at the top by the membrane (36), at the bottom by the slide (42), and at the sides by a lower component (21) of the plug (15) or by the separator (35); and the upper half-chamber is delimited at the top by the first slide (22), at the bottom by the membrane (36) and at the sides by the lower component (21) of the plug (15) or by the separator (35).

2. The device according to claim 1 wherein said membrane (36) is selected from a permeable, a waterproof or a semi-permeable membrane.

3. The device according to claim 1 wherein said membrane (36) is made of one or more of the following materials: polycarbonate, PET, PVC, polytetrafluoroethylene, PDMS, cellulose acetate, polyester, polystyrene, or nylon.

4. The device according to claim 1 wherein said membrane (36) is placed at a top of said separator (35).

5. The device according to claim 1 wherein said membrane (36) is placed at a predefined distance from a top of said separator (35).

6. The device according to claim 1 further comprising a first conductive electrode (50) for said lower half-chamber, which has a main circular crown-shaped body.

7. The device according to claim 6 further comprising a second conductive electrode (55) for said upper half-chamber, which has a main circular crown-shaped body.

8. The device according to claim 1 wherein said upper half-chamber is fluidodynamically isolated from said lower half-chamber, and the membrane (36) determines a permeability between said upper half-chamber and said lower half-chamber.

9. The device according to claim 1 wherein said separator (35) has a hollow cylindrical shape open at a bottom and closed at a top by the membrane (36).

10. The device according to claim 1 wherein said cylindrical body (41) has a base (45) with a circular crown shape that acts as a lower reference abutment for both the plug (15) and the separator (35).

11. The device according to claim 1, wherein the device is adapted for use in a cell culture of immortalised or primary cells or bacteria both in suspension and adhesion, in 2D or 3D, for creating perfused solutions containing parts derived from cells, biological molecules, or bioactive molecules.

* * * * *